Oct. 9, 1934.  C. W. STRATFORD  1,975,987
PROCESS OF REFINING HYDROCARBON OIL
Filed Nov. 3, 1930  2 Sheets-Sheet 1

INVENTOR.
Charles Walcott Stratford
BY Thos. E. Dofield
ATTORNEYS.

Oct. 9, 1934.  C. W. STRATFORD  1,975,987
PROCESS OF REFINING HYDROCARBON OIL
Filed Nov. 3, 1930   2 Sheets-Sheet 2

INVENTOR.
Charles Walcott Stratford
BY
Thos. E. Scofield
ATTORNEYS.

Patented Oct. 9, 1934

1,975,987

UNITED STATES PATENT OFFICE

1,975,987

PROCESS OF REFINING HYDROCARBON OIL

Charles Walcott Stratford, Kansas City, Mo., assignor to Stratford Development Corporation, Kansas City, Mo., a corporation of Delaware Application November 3, 1930, Serial No. 492,954

1 Claim. (Cl. 196—31)

This invention relates to improvements in treating hydrocarbon distillates and refers more particularly to a process for treating distillates adapted for fuels in internal combustion engines such as gasoline and the like.

The invention contemplates the treating of distillates for the removal of sulphur compounds by rapidly contacting the hydrocarbons in a plurality of stages, accompanied by intermediate stages of centrifugal separation and by a final continuous doctor treatment.

Provision is made for counterflowing the acid with the oil and for subjecting the oil to a soda treatment prior to and subsequent to the acid treating steps. Furthermore, provision is made for counterflowing the acid with the oil in the initial acid contacting stages, and for a single, once through acid treatment in one or more of the final acid contacting stages.

In the continuous doctor treatment of the oil, a cycle or ring of doctor solution is established. To this ring is supplied fresh doctor solution and there is drawn off a like quantity of contaminated solution. The ring is sulphurized and treated with air in order to produce the required separation of the sulphur compounds.

Figure 1:
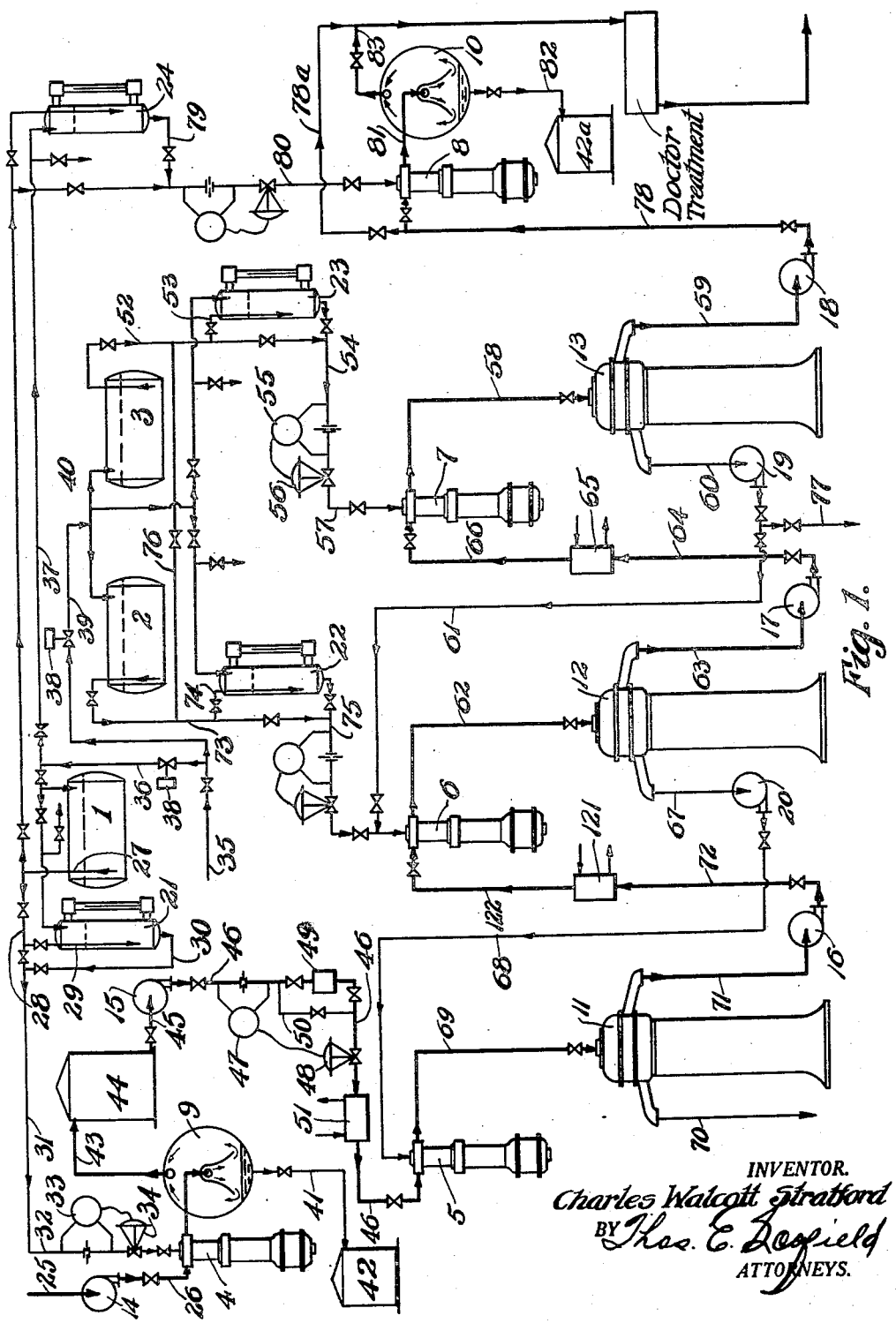
Fig. 1 shows the acid and soda treating steps of the process.

Referring to the drawings, at 1 is shown a supply tank containing the soda solution such as caustic soda normally used in the refining of hydrocarbon distillate. 2 and 3 are acid tanks. 4, 5, 6, 7, and 8 are contactors similar to the contactor described in my Patent 1,736,018, issued November 19, 1929. The contactors 4 and 8 are intended to mix the caustic soda solution with the hydrocarbon, while contactors 5, 6 and 7 comprise the acid contacting steps.

It is contemplated that these contactors may be supplemented by additional stages, if desired. The showing is limited to two stages of soda contacting and three stages of acid treatment, as it was thought that this is sufficient to disclose the operation of the process.

Numerals 9 and 10 designate settling tanks similar to the one described in my previously issued patent, before mentioned. 11, 12 and 13 are centrifuges in which the acid sludge is separated from the hydrocarbon. The numerals 14, 15, 16, 17, 18, 19 and 20 are pumps, preferably of the centrifugal type, whose function in the process will be hereinafter explained. The numerals 21, 22, 23 and 24 designate rate metering receptacles or tanks equipped with liquid level gauges in order that the rate discharge of liquid therefrom may be definitely established.

In operation, the hydrocarbon distillate is introduced from any convenient source through the suction pipe 25 of the pump 14 and is discharged through the line 26 into the contactor 4 where it is combined with a soda solution which is drawn from the tank 1 through pipe 27, line 28 and pipe 29. By means of the latter pipe, it is discharged into the metering vessel 21 from which it is withdrawn through the pipe 30, thence through line 31 and pipe 32, in which is positioned a flow control device 33 and a diaphragm valve 34.

A compressed air system, comprising an inlet pipe 35 and a distributing pipe 36 to header line 37 furnishes air to the soda tank 1 and rate metering vessels 21 and 24. This compressed air line may be used also as air vents from these receptacles. At 38 are diagrammatically shown the pressure regulating devices. The air supply pipe 35 also furnishes air to the acid tanks 2 and 3 through the pipe 39 and header 40. The soda solution and hydrocarbon distillate are intimately contacted in the contactor 4 from which the mixture is discharged into the settler 9, from which the soda solution is withdrawn through the pipe 41 to a tank 42. The hydrocarbon passes through the pipe 43 and is accumulated in a tank 44.

The soda treated distillate is withdrawn from tank 44 through the line 45 and is delivered by means of the pump 15 through line 46, equipped with flow control device 47 and diaphragm valve 48. A meter 49 is also interposed in the line. This meter is by-passed when necessary by a by-pass line 50 and suitable valves are interposed in the lines to permit the by-passing of the flow meter. Also in the line 46 is a cooler 51 which provides refrigeration to lower the temperature of the oil prior to its introduction to the contactor 5. This cooler may be of any suitable type. The cooling medium may be either water, brine, or other refrigerating media, according to requirements.

Describing first the method of treatment in Fig. 1, the oil is treated with acid by counterflowing the oil with the acid through the three successive steps. It is desirable at this point to revert to the acid supply and follow that through the system.

Acid is forced from the tank 3 by means of air pressure and is directed through the line 52 and pipe 53 into the metering receptacle 23. It is withdrawn through the pipe 54 and passes through the flow control device 55, diaphragm valve 56 and line 57 to the contactor 7. In this contactor, it meets the hydrocarbon distillate which has passed successively through the contactors 5 and 6, after first being treated in the contactor 4 with a soda solution. After combination with the distillate in the contactor 7, the mixture passes out through the line 58 to the centrifuge 13. Separation of the acid and oil takes place in the centrifuge, the hydrocarbon distillate being discharged through the line 59 and the acid through the discharge 60. This acid is picked up by pump 19 and is returned through the pipe 61 to the contactor 6 where it is introduced to the distillate which has received its initial treatment with acid in the contactor 5. After being mixed with the distillate in the contactor 6, the mixture is drawn off through the pipe 62 and is separated in the centrifuge 12. Here again the distillate is separated from the acid, the former passing out through the pipe 63, to be charged by means of the pump 17 through line 64, cooler 65, and line 66 to the contactor 7. The acid from the centrifuge 12 is drawn off through the line 67 and is charged by means of the pump 20 through line 68 into the contactor 5 where it meets the distillate which is charged thereto from the tank 44 through the line 46. The mixture of hydrocarbon and partially spent acid is withdrawn from the contactor 5 through the pipe 69, through which it is directed to the centrifuge 11. Here again the hydrocarbon is separated from the sludge acid, this being withdrawn from the system through the pipe 70, while the hydrocarbon passes out through the pipe 71 into the pump 16 by means of which it is charged to the pipe 72, cooler 121 and pipe 122, into the contactor 6.

Two acid supply tanks 2 and 3 are provided in order that acids of different concentration may be used. It is also contemplated that in the first two acid treating stages, counterflow operation with the oil may be practiced, while in the final acid contacting stage, or acid contactor designated by the numeral 7, a once through acid contacting step may be practiced. In the event that counterflow operation is to be used in the initial two contactors 5 and 6, the acid will be supplied from the tank 2 through the pipe 73, line 74, and rate metering receptacle 22, the acid being fed from the receptacle 22 through the line 75 into the contactor 6. A cross-over line 76 is also provided in order that acid may be supplied to either of the rate metering cylinders 22 or 23, from either of the tanks 2 or 3.

Valves are supplied in the lines throughout the system to furnish the necessary control.

When counterflow operation is to be practiced in contactors 5 and 6, the acid is taken from the tank 2 and is preferably of a lower Beaumé gravity than the more concentrated acid used in the final stage, or in contactor 7, which is taken from acid tank 3. In this type of operation, the more concentrated acid used in the final stage is withdrawn from the system after passing through the centrifuge, through the line 77. Hydrocarbons withdrawn from the final centrifuge 13 through the line 59, are picked up by the pump 18 and charged through the pipe 78 into the contactor 8 of the final soda treating stage. Soda solution is supplied to this contactor from the metering receptacle 24 through the pipe 79 and line 80, in which are the usual control elements.

The mixture of soda solution and hydrocarbon passes out from the contactor 8 through the pipe 81 into the settler 10. From this settling stage is recovered the soda solution which is drawn off through the pipe 82 into tank 42a, while the hydrocarbon is taken off through the pipe 83 and is directed to the continuous doctor treatment hereinafter explained in connection with Fig. 2 and designated diagrammatically by the block in Fig. 1. Should it be desired to omit the final soda stage, the hydrocarbon may be discharged through the line 78 and by-pass 78a directly into the doctor treating stage, Fig. 2.

Figure 2:
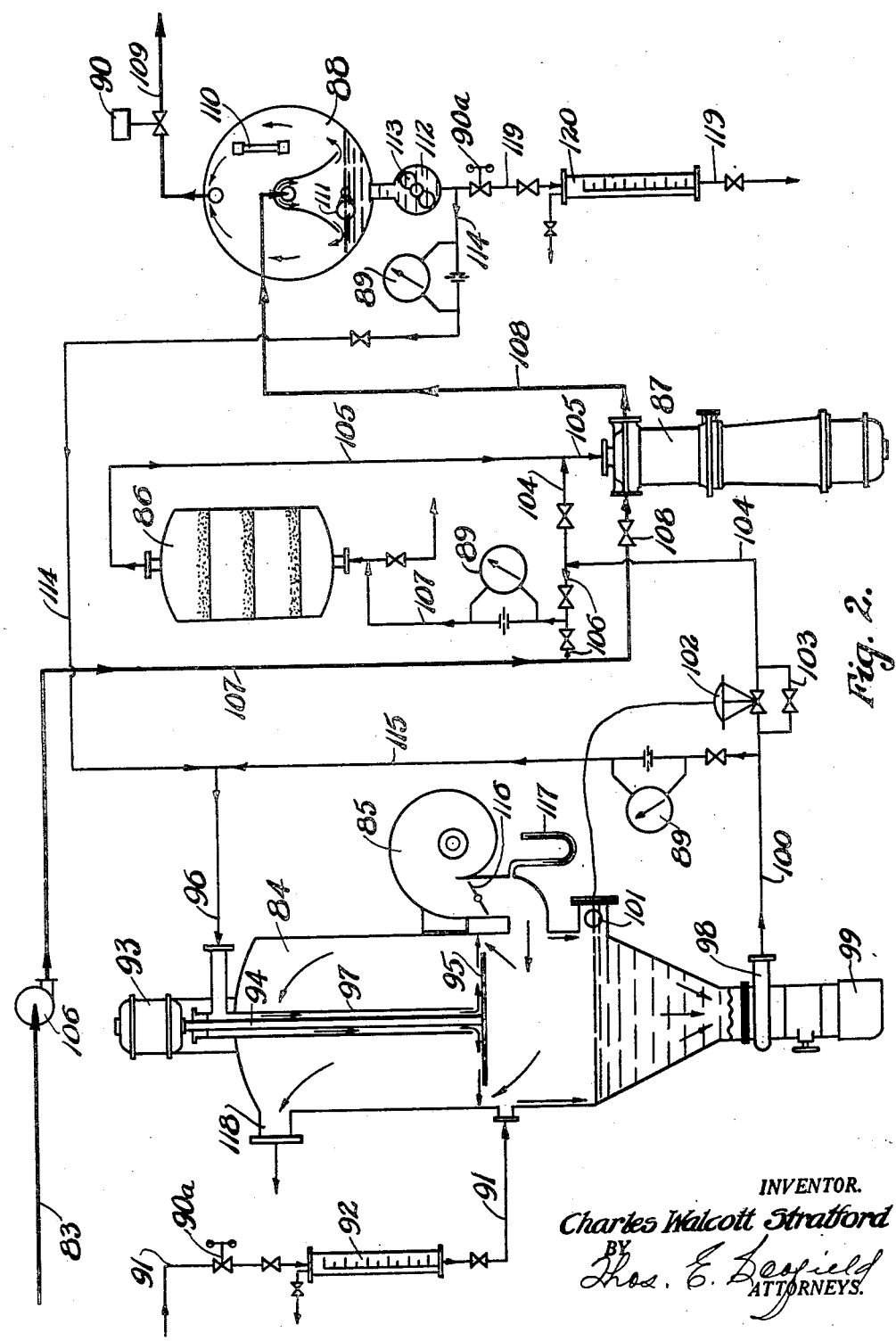
Fig. 2 is a diagrammatic showing of the continuous doctor treatment, which is connected on to the discharge end of the equipment shown in Fig. 1.

Referring to the continuous doctor, or sodium plumbite, treatment as shown in Fig. 2, 84 designates a mixing vessel equipped with an air blower fan 85. 86 is a sulphurizer, 87 is a contactor similar to that described in my issued Patent 1,736,018. 88 is a settling tank such as described in the aforesaid patent. The numerals 89 designate differential flow indicator gauges. Pressure regulators are shown at 90.

In the operation there is first established a ring circulation of doctor solution by charging doctor solution through pipe 91, the manual regulating valve 90a and through the sight glass 92, by means of which can be determined the rate of flow to the tower 84. On top of this tower is mounted a motor 93 which drives a shaft 94. At the bottom of the shaft is a disk 95, rotating at a high rate of speed and finally dispersing the liquid solution introduced to the tower through a pipe 96. This pipe terminates in the tower in a vertical pipe 97, which discharges liquid on to the top of the rotating, dispersing disk 95. The doctor solution introduced to the tower is accumulated in the bottom of the tower as shown. A centrifugal pump 98, driven by a motor 99, discharges the doctor solution from the tower through the line 100 at a rate governed by a liquid level control 101, regulating the diaphragm valve 102. This diaphragm valve may be by-passed by the line 103 by opening the valve in the by-pass. The doctor solution is directed thence through lines 104 and 105 directly to the contactor 87 or, by manipulation of the valves, it may be directed through pipe 106 and line 107 to the sulphurizer 86. In the sulphurizer the doctor solution is subjected to sulphur treatment which facilitates the separation of the objectionable compounds from the hydrocarbon.

On discharge from the top of the sulphurizer, the doctor solution is directed through the pipe 105 to the contactor. The hydrocarbon oil, which is introduced through the pipe 83, is picked up by pump 106 and is directed through the line 107 directly into the contactor, to be mixed with the doctor solution which may or may not be sulphurized as described, or a portion of the distillate by regulation of the valve 106′ may be diverted through the line 107′ into the sulphurizer. By diverting a portion of the hydrocarbon in this manner, the oil is sulphurized in place of the doctor solution. The equipment is adaptable to either type of operation and the choice lies with the operator as to the particular type of oil with which he is working.

Under either method, whether it be the hydrocarbon or the doctor solution which is sulphurized, they are mixed in the contactor 87 and discharged as an intimate mixture through the pipe 108′. In the settler 88, a separation is made, the treated hydrocarbon passing off through the line 109, in which line is interposed an automatic pressure regulator 90. The settler is equipped with a sight glass 110, which indicates to the operator whether or not the doctor solution has been separated from the hydrocarbon.

In the lower part of the settler is an interfacial level indicator 111, which registers the major level of the separated doctor solution and contaminating products which pass down into the elongated receptacle 112 in which is positioned a propeller 113. The function of the propeller is to prevent accumulation of solid or plastic sludge separated during the doctor treatment. This separated doctor solution is then directed back through the pipe 114 to the top of the tower through the line 96. A cross-over pipe 115 is connected between the line 100 and the line 114 joining the latter at a T-connection with the line 96. This cross-over 115 is used as a recirculation line in the event that it is desired to circulate the doctor solution through the tower 84 to permit additional aeration or air blowing.

As suggested, the doctor solution introduced into the top of the tower through the line 96 is finely dispersed in a thin film by the rotating disk 95 and through this film is blown air by means of the blower 85. Regulation of the air supply is obtained by a damper 116 and an accurate control of rate of air flow is made possible by the indicating manometer 117. The air introduced by the blower aerates the doctor solution by passing through the film at the circumference of the disk 95 and is discharged from the tower through an upper outlet 118.

There is continuously removed from this circulating ring of doctor solution an amount of contaminated solution comparable to the fresh solution supplied through the line 91. This bleed from the system is taken off through the pipe 119 controlled by suitable valves, in which is interposed the manual regulating valve 90a and the sight glass 120 for determining the rate of flow.

By means of this continuous doctor system, there is established a circulating ring of doctor solution in which are interposed sulphurizing and air blowing stages. Into this ring is introduced a supply of fresh solution and from the ring is continuously withdrawn a like amount of contaminated product. In this way the hydrocarbon introduced to the ring is effectively treated with a doctor solution having a constant and uniform character so that the product hydrocarbon taken off through the line 109 is of an established uniform grade.

It is appreciated that this equipment may be varied without departing from the spirit and scope of the invention. Innumerable changes may be made in the equipment and the method of hooking up a system of this character, without departing from the spirit and scope of the invention. To establish and maintain a continuous treating ring of doctor solution introducing a hydrocarbon thereto and withdrawing a uniform product hydrocarbon while maintainining the character of the doctor solution relatively constant is thought to be novel practice.

The process may be adapted for the treatment of lube stocks as well as fuel distillates. When treating lube oils, the time periods of acid contact must necessarily be lengthened due to the higher viscosity of the materials.

The combination process, utilizing a plurality of acid and soda treating steps, with intermediate steps of contrifugal separation, by which polymerization and loss is reduced to a minimum, followed by a continuous sodium plumbite treatment maintained constantly uniform in character, has certainly never been practiced in commercial operation. A further advantage in the process lies in its flexibility in the variation of the type of acid treatment steps according to the requirements of the different types of oil.

I claim as my invention:

A process of refining hydrocarbon oil which comprises contacting the oil with an acid while passing the oil in counterflow to the acid in a plurality of contacting stages; subjecting the oil after being contacted with acid in each contacting stage to centrifugal separation to separate the oil from the acid and subjecting the oil thus free from the bulk of the acid to positive cooling before discharge to the next contacting stage.

CHARLES WALCOTT STRATFORD.